US011555919B2

(12) United States Patent
McEwan et al.

(10) Patent No.: US 11,555,919 B2
(45) Date of Patent: Jan. 17, 2023

(54) RADAR CALIBRATION SYSTEM

(71) Applicant: Ford Global Technologies, LLC, Dearborn, MI (US)

(72) Inventors: Douglas James McEwan, Saline, MI (US); Timothy Stolzenfeld, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 627 days.

(21) Appl. No.: 16/594,483

(22) Filed: Oct. 7, 2019

(65) Prior Publication Data

US 2021/0103050 A1 Apr. 8, 2021

(51) Int. Cl.
| | |
|---|---|
| *G01S 13/931* | (2020.01) |
| *G01S 13/34* | (2006.01) |
| *G01S 7/40* | (2006.01) |
| *G01S 13/48* | (2006.01) |
| *G01S 3/74* | (2006.01) |
| *G01S 13/42* | (2006.01) |

(52) U.S. Cl.
CPC .............. *G01S 13/931* (2013.01); *G01S 3/74* (2013.01); *G01S 7/4026* (2013.01); *G01S 13/34* (2013.01); *G01S 13/42* (2013.01); *G01S 13/48* (2013.01)

(58) Field of Classification Search
None
See application file for complete search history.

(56) References Cited

U.S. PATENT DOCUMENTS

| | | | |
|---|---|---|---|
| 9,916,703 B2 | 3/2018 | Levinson et al. | |
| 2010/0235129 A1 | 9/2010 | Sharma et al. | |
| 2016/0129917 A1 | 5/2016 | Gariepy et al. | |
| 2016/0223661 A1* | 8/2016 | Song | G01S 13/86 |
| 2018/0045811 A1* | 2/2018 | Cao | G01S 13/931 |
| 2018/0307238 A1 | 10/2018 | Wisniowski | |
| 2019/0049242 A1* | 2/2019 | Adams | G01S 17/06 |

FOREIGN PATENT DOCUMENTS

EP  3318889 A1  5/2018

\* cited by examiner

*Primary Examiner* — Whitney Moore
(74) *Attorney, Agent, or Firm* — Frank A. MacKenzie; Bejin Bieneman PLC

(57) ABSTRACT

A system includes a computer including a processor and a memory. The memory includes instructions such that the processor is programmed to: receive, from a radar sensor of a vehicle, radar data indicative of a stationary object proximate to the radar sensor; receive, from a non-radar sensor of the vehicle, vehicle state data indicative of a vehicle state, the vehicle state data indicative of at least a longitudinal velocity and a yaw rate of the vehicle; determine an orientation estimate and an offset estimate of the radar sensor based on the radar data and the vehicle state data; and determine whether to actuate a vehicle system based on at least one of the orientation estimate or the offset estimate.

21 Claims, 8 Drawing Sheets

RADAR CALIBRATION SYSTEM

BACKGROUND

Vehicles use sensors to collect data while operating, the sensors including radar, LIDAR, vision systems, infrared systems, and ultrasonic transducers. Vehicles can actuate the sensors to collect data while traveling along roadways. Based on the data, it is possible to determine parameters associated with the vehicle. For example, sensor data can be indicative of objects relative to the vehicle.

DETAILED DESCRIPTION

Figure 1:
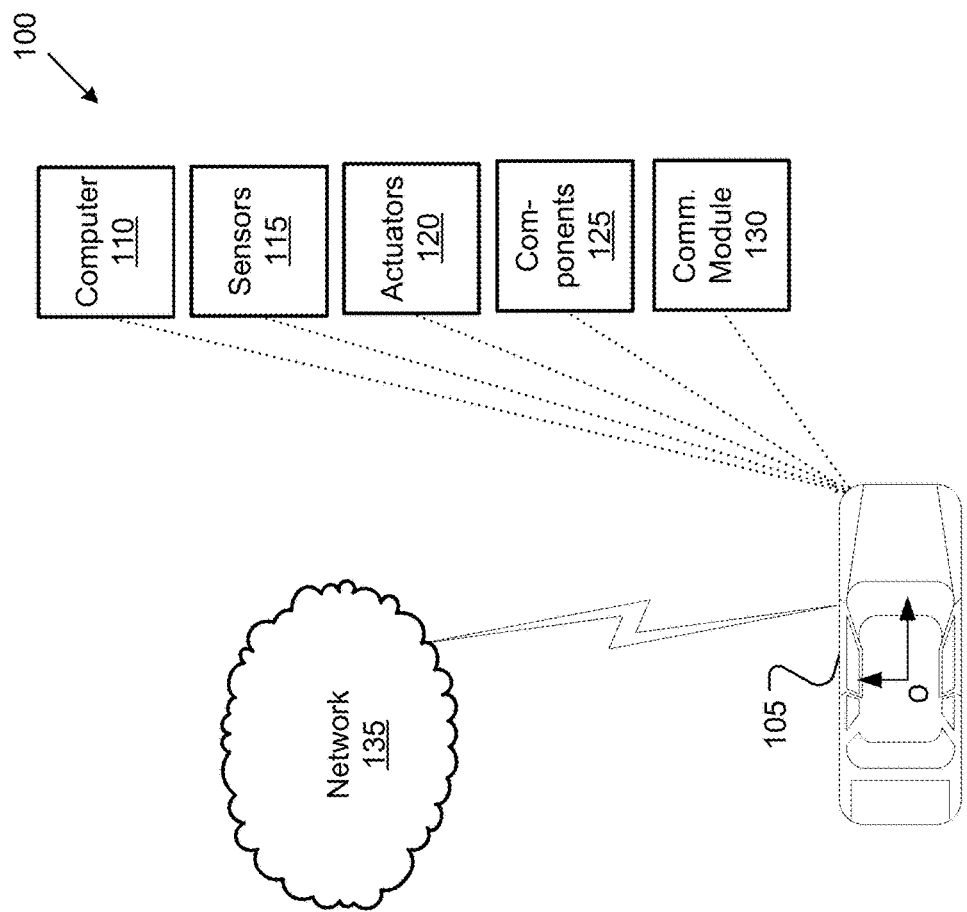
FIG. 1 is a diagram of an example system for determining a position and/or an orientation of a radar sensor within a vehicle.

Vehicle sensors can provide information about a vehicle's surrounding environment, and computers can use sensor data detected by the vehicle sensors to classify objects and/or estimate one or more physical parameters pertaining to the surrounding environment. These vehicle sensors can include radar sensors that provide data indicative of objects around the vehicle and non-radar sensors that can provide data indicative of one or more vehicle states, such as longitudinal velocity, lateral velocity, yaw rate, and the like.

The present disclosure describes a system that determines a position, e.g., offset, and/or orientation of a radar sensor within an operating environment of a vehicle. For instance, one or more vehicle systems may use radar return data for vehicle control purposes. The vehicle systems typically require the position and the orientation of the radar sensor for determining vehicle control actions based on received radar data.

A system comprises a computer including a processor and a memory, and the memory including instructions such that the processor is programmed to receive, from a radar sensor of a vehicle, radar data indicative of a stationary object proximate to the radar sensor; receive, from a non-radar sensor of the vehicle, vehicle state data indicative of a vehicle state, the vehicle state data indicative of at least a longitudinal velocity and a yaw rate of the vehicle; determine an orientation estimate and an offset estimate of the radar sensor based on the radar data and the vehicle state data; and determine whether to actuate a vehicle system based on at least one of the orientation estimate or the offset estimate.

In other features, the processor is further programmed to actuate the vehicle system based on at least one of the orientation estimate or the offset estimate.

In other features, the actuation of the vehicle system includes disabling an autonomous driving mode of the vehicle.

In other features, the processor is further programmed to determine an orientation estimate and the offset estimate of the radar sensor according to $v_x \cos(\theta+\phi)+v_y \sin(\theta+\phi)+\dot{\psi}(L_x \sin(\theta+\phi)-L_y \cos(\theta+\phi))+\dot{r}=0$, where $v_x$ represents the longitudinal velocity, $v_y$ represents lateral velocity, $\dot{\psi}$ represents the yaw rate, $\phi$ represents an angle of a radar sensor return relative to a center of the radar sensor, $\dot{r}$ represents a range rate of the radar sensor return, $\theta$ represents an orientation of the radar sensor, $L_x$ represents a longitudinal position of the radar sensor, and $L_y$ represents a lateral position of the radar sensor.

In other features, the processor is further programmed to determine the orientation estimate of the radar sensor based on a Kalman filter.

In other features, a Kalman filter gain of the Kalman filter is defined as $K=\Sigma H^T(H\Sigma H^T+J_{Vx}\Sigma_{Vx}J_{Vx}^T+J_{Vy}\Sigma_{Vy}J_{Vy}^T+J_\phi\Sigma_\phi J_\phi^T+\Sigma \dot{r})^{-1}$, where H is a Jacobian of the $\dot{r}$ with respect to an orientation estimate, $H^T$ represents a transpose of the Jacobian H, $J_{Vx}$ represents a Jacobian of the longitudinal velocity with respect to the $\dot{r}$, $J_{Vy}$ represents a Jacobian of the lateral velocity with respect to the $\dot{r}$, $J_\phi$ represents a Jacobian of an azimuth of the radar sensor with respect to the $\dot{r}$, $\Sigma_{Vx}$ represents a variance associated with $v_x$, $\Sigma_{Vy}$ represents a variance associated with $v_y$, $\Sigma_\phi$ represents a variance associated with $\phi$, and $\Sigma\dot{r}$ represent a variance associated with $\dot{r}$.

In other features, the processor is further programmed to determine the offset estimate of the radar sensor based on a Kalman filter.

In other features, a Kalman filter gain of the Kalman filter is defined as $Ko=\Sigma H^T(H\Sigma H^T+J_{\dot{\psi}}\Sigma_{\dot{\psi}}J_{\dot{\psi}}^T+J_{Vx}\Sigma_{Vx}J_{Vx}^T+J_{Vy}\Sigma_{Vy}J_{Vy}^T+J_\phi\Sigma_\phi J_\phi^T+J_\theta\Sigma_\theta J_\theta^T+\Sigma\dot{r})^{-1}$, where H is a Jacobian of the $\dot{r}$ with respect to the offset estimate, $H^T$ represents a transpose of the Jacobian H, $J_{\dot{\psi}}$ represents a Jacobian of the yaw rate with respect to the $\dot{r}$, $J_{Vx}$ represents a Jacobian of the longitudinal velocity with respect to the $\dot{r}$, $J_{Vy}$ represents a Jacobian of the lateral velocity with respect to the $\dot{r}$, $J_\phi$ represents a Jacobian of an azimuth of the radar sensor with respect to the $\dot{r}$, $\Sigma_{\dot{\psi}}$ represents a variance associated with $\dot{\psi}$, $\Sigma_{Vx}$ represents a variance associated with $v_x$, $\Sigma_{Vy}$ represents a variance associated with $v_y$, $\Sigma_\phi$ represents a variance associated with $\phi$, and $\Sigma\dot{r}$ represent a variance associated with $\dot{r}$.

In other features, the non-radar sensor includes at least one of a wheel odometry sensor, an inertial measurement unit, a visual odometry sensor, or a Global Positioning System sensor.

In other features, the processor is further programmed to filter radar data and vehicle state data indicating that at least one of a lateral velocity is greater than or equal to a predetermined lateral velocity threshold or a yaw rate is greater than or equal to a predetermined yaw rate threshold.

In other features, the processor is further programmed to select an initial orientation based on a most-occurring calculated orientation value within a plurality of calculated orientation values.

In other features, the processor is further programmed to associate the vehicle state data with the radar data based on a respective timestamp of the vehicle state data and the radar data being received within a defined time period.

A method comprises receiving, from a radar sensor of a vehicle, radar data indicative of a stationary object proximate to the radar sensor; receiving, from a non-radar sensor of the vehicle, vehicle state data indicative of a vehicle state, the vehicle state data indicative of at least a longitudinal velocity and a yaw rate of the vehicle; determining an orientation estimate and an offset estimate of the radar sensor based on the radar data and the vehicle state data; and determining whether to actuate a vehicle system based on at least one of the orientation estimate or the offset estimate.

In other features, the method includes actuating the vehicle system based on the at least one of the orientation estimate or the offset estimate.

In other features, the actuation of the vehicle system includes disabling an autonomous driving mode of the vehicle.

In other features, the method includes determining the orientation estimate and the offset estimate of the radar sensor according to $v_x \cos(\theta+\phi)+v_y \sin(\theta+\phi)+\dot{\psi}(L_x \sin(\theta+\phi)-L_y \cos(\theta+\phi))+\dot{r}=0$, where $v_x$ represents the longitudinal velocity, $v_y$ represents lateral velocity, $\dot{\psi}$ represents the yaw rate, $\phi$ represents an angle of a radar sensor return relative to a center of the radar sensor, $\dot{r}$ represents a range rate of the radar sensor return, $\theta$ represents the orientation estimate of the radar sensor, $L_x$ represents a longitudinal position of the radar sensor, and $L_y$ represents a lateral position of the radar sensor.

In other features, the method includes determining the orientation estimate of the radar sensor based on a Kalman filter.

In other features, the Kalman filter is defined as $K=\Sigma H^T (H\Sigma H^T + J_{V_x}\Sigma_{V_x}J_{V_x}^T + J_{V_y}\Sigma_{V_y}J_{V_y}^T + J_\phi\Sigma_\phi J_\phi^T + \Sigma\dot{r})^{-1}$, where H is a Jacobian of the $\dot{r}$ with respect to an orientation estimate, $H^T$ represents a transpose of the Jacobian H, $J_{V_x}$ represents a Jacobian of the longitudinal velocity with respect to the $\dot{r}$, $J_{V_y}$ represents a Jacobian of the lateral velocity with respect to the $\dot{r}$, $J_\phi$ represents a Jacobian of an azimuth of the radar sensor with respect to the $\dot{r}$, $\Sigma_{V_x}$ represents a variance associated with $v_x$, $\Sigma_{V_y}$ represents a variance associated with $v_y$, $\Sigma_\phi$ represents a variance associated with $\phi$, and $\Sigma\dot{r}$ represent a variance associated with $\dot{r}$.

In other features, the non-radar sensor includes at least one of a wheel odometry sensor, an inertial measurement unit, a visual odometry sensor, or a Global Positioning System sensor.

In other features, the method includes selecting an initial orientation based on a most-occurring calculated orientation value within a plurality of calculated orientation values.

FIG. 1 is a block diagram of an example vehicle control system 100. The system 100 includes a vehicle 105, such as a car, truck, robot, boat, plane, etc. The vehicle 105 includes a computer 110, vehicle sensors 115, actuators 120 to actuate various vehicle components 125, and a vehicle communications module 130. Via a network 135, the communications module 130 allows the computer 110.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide range and velocity of objects, etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known.

The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

As discussed herein, the vehicle 105 includes one or more radar sensor(s) 115 disposed about the vehicle 105. Advanced driver-assistance systems (ADAS) can use data provided by the radar sensor 115 to aid drivers with controlling the vehicle 105. ADAS can include, but is not limited to, electronic stability control systems, anti-lock braking systems, lane departure warning systems, adaptive cruise control systems, and traction control systems. The radar sensor 115 can provide radar data indicative of an angle at which the radar sensor 115 transmitted a wave (azimuth angle), a radial distance from the radar sensor 115 to the object (range), and/or a radial velocity of an object with respect to the radar sensor 115 (range rate).

In order to determine a vehicle action, the ADAS typically requires a precise knowledge of geometry (e.g., orientation, offset) of the radar sensor(s) 115. The geometry of the radar sensor(s) 115 includes a longitudinal offset and a lateral offset, and the orientation of the radar sensor(s) 115 includes a mounting angle of the radar sensor(s) 115 within the vehicle 105. The longitudinal offset, the lateral offset, and the mounting angle may be determined relative to an origin of the vehicle 105 (depicted as "O" in FIG. 1). Within the present context, the longitudinal offset, the lateral offset, and the orientation, i.e., mounting angle, of a radar sensor 115 may be referred to as radar extrinsic parameters (REPs).

As discussed herein, the vehicle 105 computer 110 can determine the REPs, i.e., estimates the orientation, the longitudinal offset, and/or the lateral offset, of a radar sensor 115 based on one or more vehicle 105 parameters. In an implementation, the computer 110 uses vehicle longitudinal velocity ($v_x$), vehicle lateral velocity ($v_y$), and/or vehicle yaw rate ($\dot{\psi}$) to determine the REPs. The vehicle 105 parameters are determined based on data provided by other vehicle 105 sensors 115, e.g., non-radar sensors 115. For example, the non-radar sensors 115 can include, but are not limited to, wheel odometry sensors 115, speed sensors 115, inertial measurement units 115, visual odometry sensors 115, or Global Positioning System (GPS) sensors 115. It is understood that other types of non-radar sensors can also be utilized.

As discussed in greater detail below, the vehicle 105 computer 110 determines the REPs of the radar sensor 115 based on estimated vehicle 105 state data and radar sensor 115 measurements. The estimated vehicle 105 state data can be estimated from the non-radar sensor 115 sources. The computer 110 is configured to use Equation 1 to determine one or more REPs of the radar sensor 115, which is defined as:

$$v_x \cos(\theta+\phi)+v_y \sin(\theta+\phi)+\dot{\psi}(L_x \sin(\theta+\phi)-L_y \cos(\theta+\phi))+\dot{r}=0 \qquad \text{Eq. 1,}$$

where $v_x$ represents the vehicle 105 longitudinal velocity, $v_y$ represents the vehicle 105 lateral velocity, $\dot{\psi}$ represents the vehicle 105 yaw rate, $\phi$ represents the angle of the radar sensor 115 return relative to the center of the radar sensor 115, $\dot{r}$ represents the range rate of the radar sensor 115 return, $\theta$ represents the orientation of the radar sensor 115, $L_x$ represents the longitudinal position of the radar sensor 115, and $L_y$ represents the lateral position of the radar sensor 115. For stationary objects relative to the vehicle 105, Equation 1 relates the radar sensor 115 return angle and the range rate of the radar sensor 115 to a vehicle 105 state.

Figure 2:
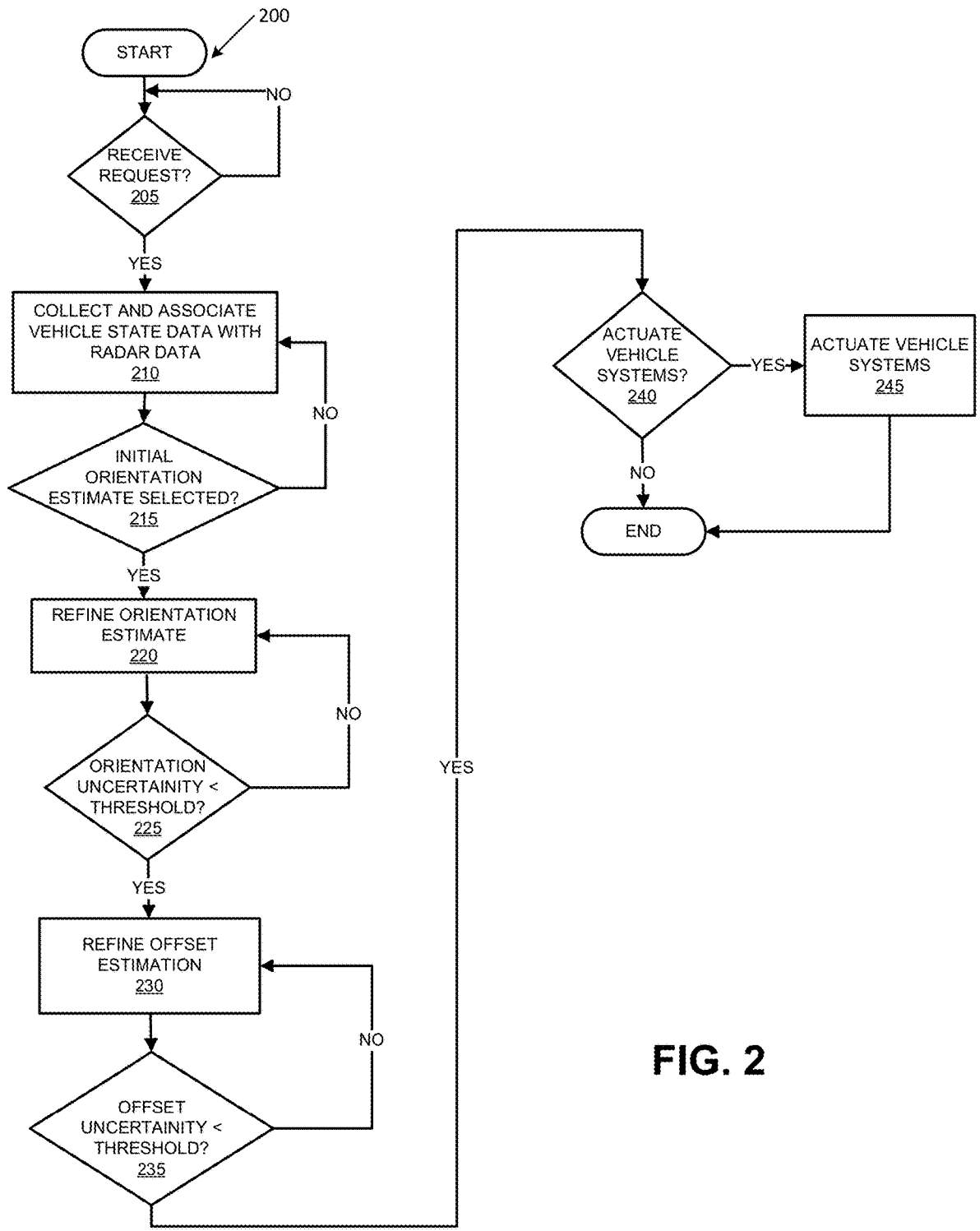
FIG. 2 is flow diagram illustrating an example process for determining a position and/or an orientation of a radar sensor within a vehicle.

FIG. 2 is a flowchart of an exemplary process 200 for determining one or more REPs of a radar sensor 115. Blocks of the process 200 can be executed by the computer 110. The process 200 begins at block 205 in which a determination is made whether a request to estimate the REPs of the radar sensor 115 has been received. If the request has not been received, the process 200 returns to block 205. If the request has been received, the computer 110 collects and associates vehicle 105 state data and radar sensor 115 data at block 210. In an example implementation, the computer 110 associates vehicle 105 state data obtained by non-radar sensors 115 with corresponding radar data obtained by the radar sensor 115. Radar data may correspond to vehicle 105 state data when a timestamp of the radar data is within a defined time period, e.g., 0.05 seconds, 0.1 seconds, 0.5 seconds, 1 second, etc. of a timestamp of the vehicle 105 state data. In an example implementation, buffered vehicle state data is interpolated to estimate the corresponding vehicle state at each of the radar return timestamps.

At block 215, a determination is made whether an initial orientation estimate has been selected. The process for selecting the initial orientation estimate is described below with respect to FIGS. 3 and 4. If the initial orientation estimate has not been selected, the process 200 returns to block 210. Otherwise, the process 200 refines the orientation estimate at block 220. At block 225, a determination is made whether the orientation estimate uncertainty is less than a predetermined orientation estimate threshold. If the orientation estimate uncertainty is not less than the predetermined orientation estimate threshold, the process 200 returns to block 220. The process for refining the orientation estimate is described below with respect to FIGS. 5 and 6.

Otherwise, at block 230, the process 200 refines an offset estimation, i.e., longitudinal offset estimate and lateral offset estimate. At block 235, a determination is made whether the offset estimate is less than a predetermined offset estimate threshold. If the offset estimate is not less than the predetermined offset estimate threshold, the process 200 returns to the block 230. The process for refining the offset estimate is described below with respect to FIGS. 7 and 8.

At block 240, a determination is made whether to actuate one or more vehicle 105 systems based on the orientation estimate and/or the offset estimate. If the determination is made to actuate a vehicle 105 system, the vehicle 105 systems are actuated at block 245. In an implementation, the computer 110 may disable one or more vehicle 105 systems based on the orientation estimate and/or offset estimate. For example, the computer 110 may disable the autonomous or semi-autonomous modes of the vehicle 105 based on the orientation estimate and/or offset estimate. The computer 110 may also generate an alert indicating the current status of the orientation and/or offset of the radar sensor 115. In some examples, the computer 110 may cause one or more actuators 120 to actuate one or more components 125 of the radar sensor 115 such that the determined orientation and/or offset match a preset orientation and/or offset. In another examples, the computer 110 may calibrate one or more vehicle systems according to the determined orientation and/or offset.

Figure 3:
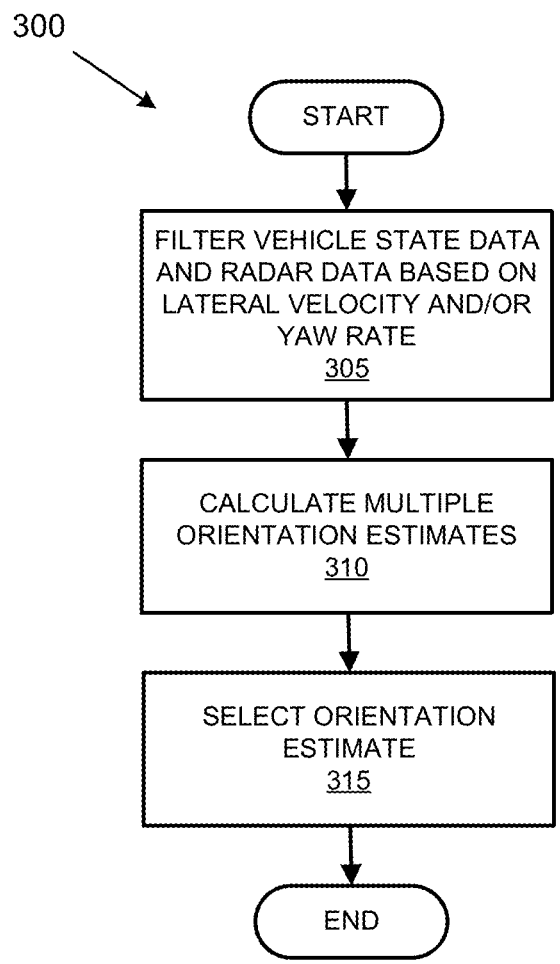
FIG. 3 is a flow diagram illustrating an example process for determining an initial orientation estimate of a radar sensor.

FIG. 3 is a flowchart of an exemplary process 300 for determining an initial orientation estimate of a radar sensor 115. Blocks of the process 300 can be executed by the computer 110. The process 300 begins at block 305 in which vehicle 105 state data and corresponding radar data having lateral velocity greater than a predetermined lateral velocity threshold and/or a yaw rate greater than a predetermined yaw rate threshold is filtered, i.e., removed. In order to simplify Equation 1 to Equation 2, which is defined as:

$$v_x \cos(\theta+\phi)+\dot{r}=0 \qquad \text{Eq. 2,}$$

vehicle 105 state data and corresponding radar data including a lateral velocity and/or a yaw rate greater than a respective predetermined threshold is removed. Otherwise, the vehicle 105 state data and corresponding radar data is stored. In some examples, this data may be deleted once additional data is received and used for calculation purposes as discussed herein. At block 310, multiple orientation estimates of the radar sensor 115 are calculated using the vehicle 105 state data and corresponding radar data. The computer 110 determines multiple orientation estimates of the radar sensor 115 according to Equation 3 (solving Equation 2 for θ), which is defined as:

$$\theta = \pm \cos^{-1}\left(-\frac{\dot{r}}{v_x}\right)-\phi, . \qquad \text{Eq. 3}$$

For example, using Equation 3, the computer 110 calculates multiple orientation estimates of the radar sensor 115 based on multiple vehicle 105 state and corresponding radar data points using the range rate of the radar sensor 115 return ($\dot{r}$), the vehicle longitudinal velocity ($v_x$), and the angle of the radar sensor 115 return relative to the center of the radar sensor 115 ($\phi$).

Figure 4:
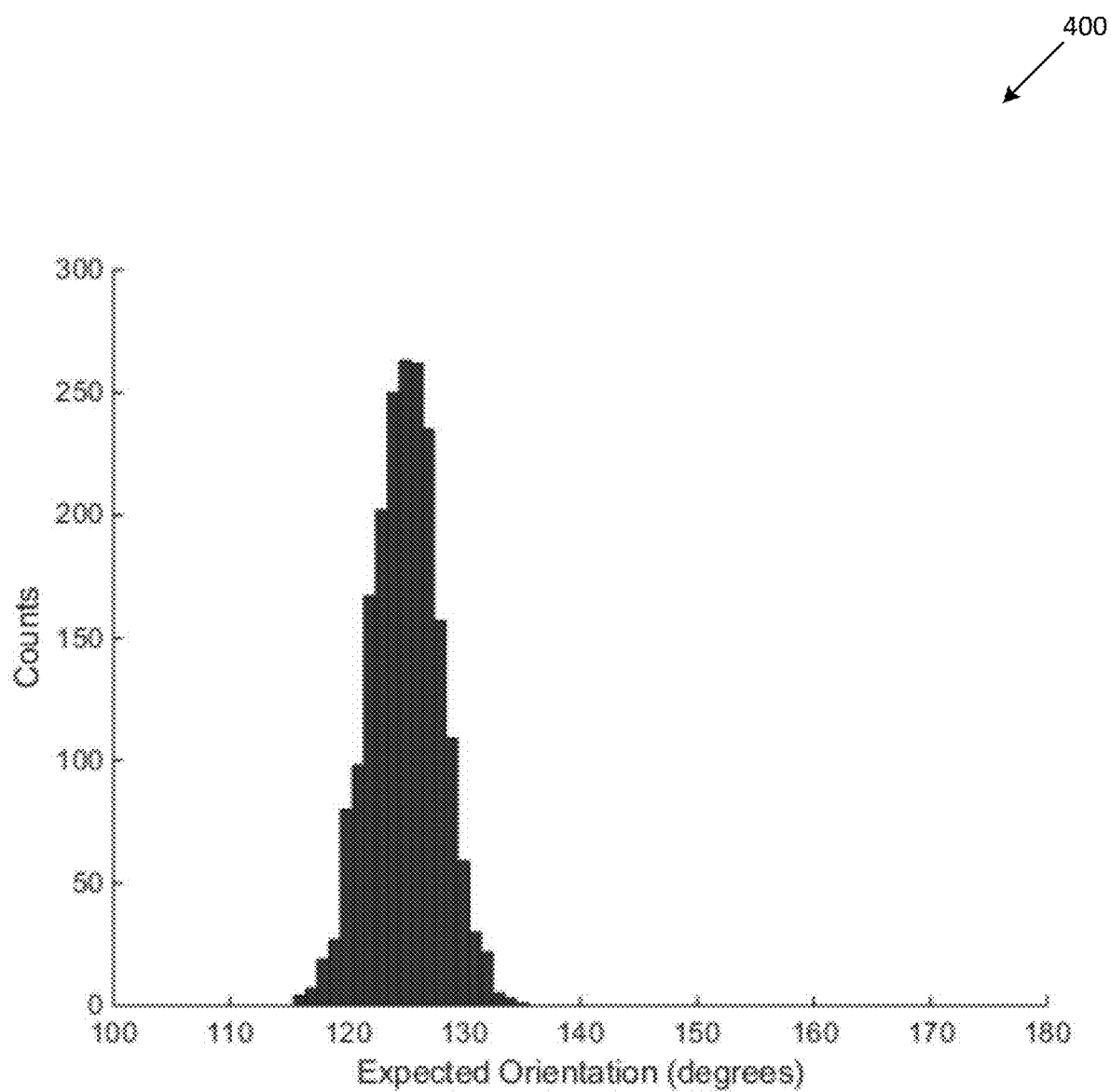
FIG. 4 is an example histogram illustrating multiple calculated orientation estimates based on radar sensor data and non-radar sensor data.

At block 315, an orientation estimate for the radar sensor 115 is selected from the calculated orientation estimates and an orientation variance is determined based on the selected orientation estimate. In an example implementation, the computer 110 can select an initial orientation estimate from the multiple orientations based on the most occurring calculated orientation value. FIG. 4 illustrates an example histogram 400 generated by the computer 110 based on the expected orientations. In this example, the computer 110 selects one hundred and twenty-five degrees (125°) as the orientation estimate since this value is the most occurring calculated orientation value. The other orientation values illustrated in the histogram 400 may represent orientation values that include noise, such as noise from detecting non-stationary objects, or the like. Within the present context, the histogram 400 is used with measurements corresponding to stationary objects since orientation estimates corresponding to stationary objects are unique.

Figure 5:
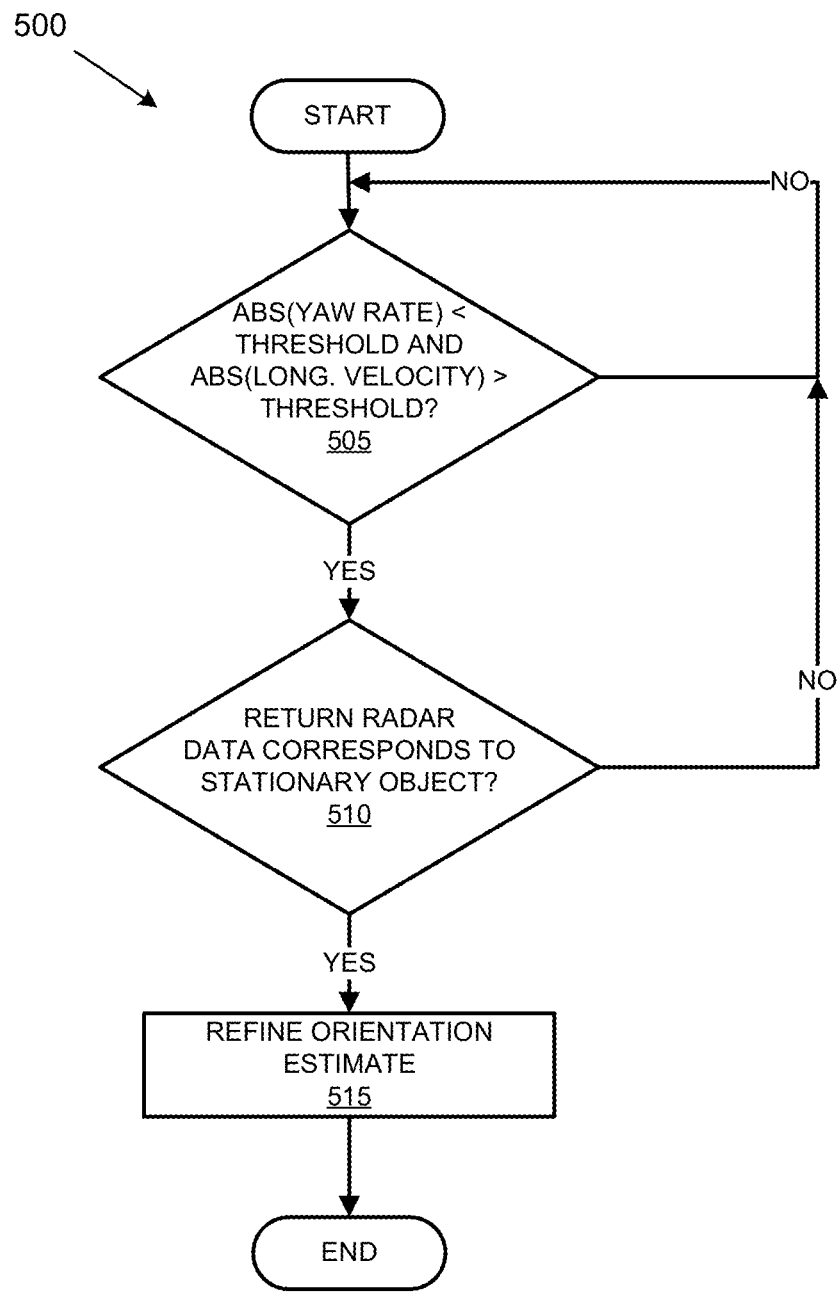
FIG. 5 is a flow diagram illustrating an example process for determining whether an iterative orientation estimate should occur for the corresponding detection.

FIG. 5 is a flowchart of an exemplary process 500 for updating the orientation estimate for the radar sensor 115. Blocks of the process 500 can be executed by the computer 110. The process 500 begins at block 505, a determination is made whether the absolute value of the yaw rate is less than a predetermined yaw rate threshold and whether the absolute value of the longitudinal velocity is greater than a predetermined longitudinal velocity threshold. If the absolute value of the yaw rate is not less than the predetermined yaw rate threshold or the absolute value of the longitudinal velocity is not greater than a predetermined longitudinal velocity threshold, the process 500 returns to block 505.

If the absolute value of the yaw rate is less than the predetermined yaw rate threshold and the absolute value of the longitudinal velocity is greater than a predetermined longitudinal velocity threshold, a determination is made whether the radar sensor 115 return data corresponds to a stationary object at block 510. In an example implementation, the computer 110 determines whether a calculation using Equation 1 is within a predefined Mahalanobis Distance based on the orientation estimate uncertainty. In this context, using radar sensor 115 data corresponding to non-stationary objects would cause Equation 1 to equate to a value outside of the predefined threshold indicating the radar sensor 115 is receiving data indicative of a non-stationary object. If the radar sensor 115 return data does not correspond to a stationary object, the process 500 returns to block 505. If the radar sensor 115 return data corresponds to a stationary object, the orientation estimate is refined at block 525. An example process for updating the orientation estimate is discussed below with respect to FIG. 6.

Figure 6:
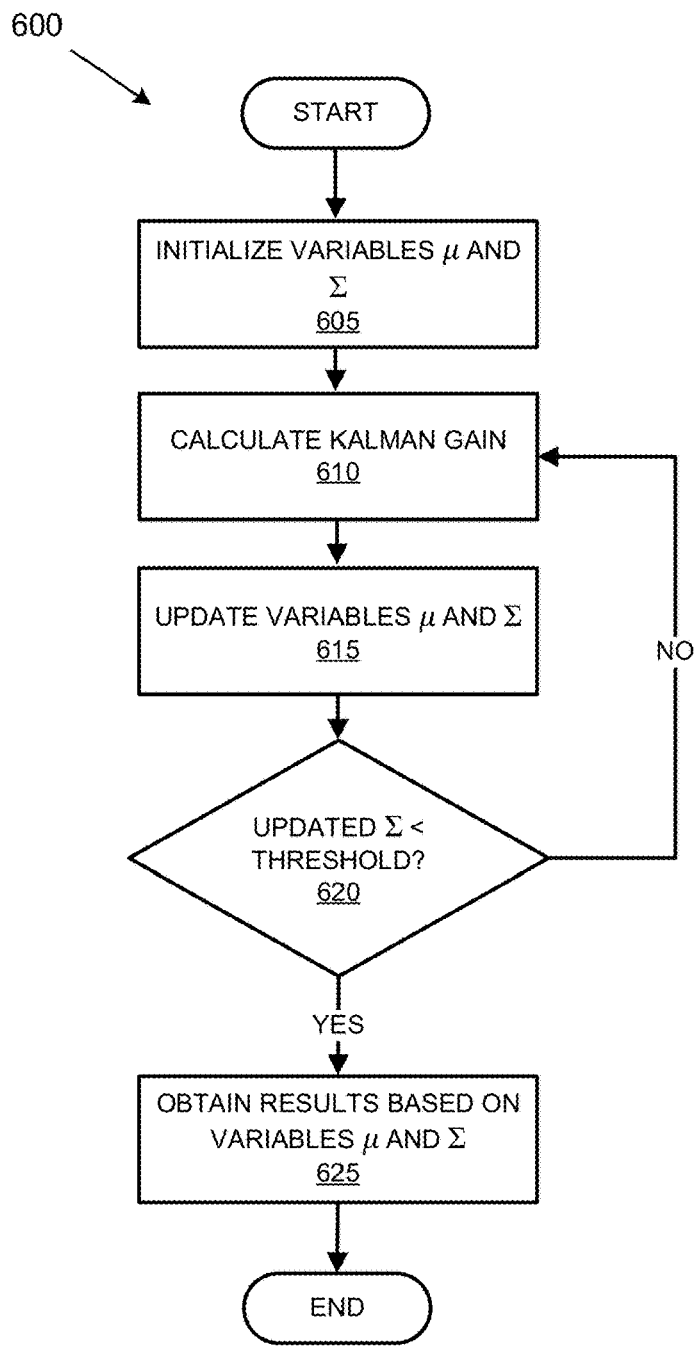
FIG. 6 is a flow diagram illustrating another example process for updating the orientation estimate for the radar sensor.

FIG. 6 is a flowchart of an exemplary process 600 for updating the orientation estimate for the radar sensor 115. Blocks of the process 600 can be executed by the computer 110. The process 600 begins at block 605 in which the computer 110 initializes variable μ to the selected orientation estimate, which is discussed above and in relation to FIGS. 3 and 4, and variable Σ to a variance corresponding to the selected orientation estimate. In an example implementation, the variable Σ may be the covariance of the distribution of calculated orientations. The variables μ and Σ may also be preset according to the computer 110 in some implementations.

At block 610, a Kalman gain K is calculated. The computer 110 calculates a Kalman gain K based on the variable Σ according to Equation 4:

$$K = \Sigma H^T (H \Sigma H^T + J_{Vx} \Sigma_{Vx} J_{Vx}^T + J_{Vy} \Sigma_{Vy} J_\phi \Sigma_\phi J_\phi^T \Sigma \dot{r})^{-1},\quad \text{Eq. 4}$$

where H is the Jacobian of the measurement ṙ with respect to the orientation estimate θ, which is computed using Equation 1. The variable $H^T$ represents the transpose of the Jacobian H. The variables $J_{Vx}$, $J_{Vy}$, and $J_\phi$ represent the Jacobians of the longitudinal velocity, the lateral velocity, and azimuth values with respect to the measurement ṙ, which can also be computed using Equation 1. The variables $\Sigma_{Vx}$, $\Sigma_{Vy}$, $\Sigma_\phi$ and $\Sigma\dot{r}$ represent the variances associated with $v_x$, $v_y$, φ and ṙ, respectively.

At block 615, the variables μ and Σ are updated based on additional data received by the non-radar sensors 115 and the radar sensors 115. In an example implementation, the computer 110 updates the variables μ and Σ using Equations 5 and 6 using additional data, which are defined as:

$$\mu_c = \mu_p + K(\dot{r} - h(\mu, vx, vy, \phi)),\quad \text{Eq. 5}$$

$$\Sigma_c = (I - KH)\Sigma_p,\quad \text{Eq. 6}$$

The variable $\mu_c$ represents the current orientation estimate, the variable $\mu_p$ represents the previously calculated orientation estimate, the variable $\Sigma_c$ represents the current variance, the variable $\Sigma_p$ represents the previously calculated variance, and h(μ,vx,vy,φ) represents the expected measurement calculated using Equation 1. The computer 110 may iteratively calculate $\mu_c$ and $\Sigma_c$ such that the orientation estimate continues to converge about a value that represents the orientation of the radar sensor 115. At block 620, a determination is made whether the variable $\Sigma_c$ is below a predetermined uncertainty threshold. If the variable $\Sigma_c$ is not below the predetermined uncertainty threshold, the process 600 returns to block 610. Otherwise, the variables μ and Σ are set to the current calculated values at block 625, and μ is used as the determined orientation.

Figure 7:
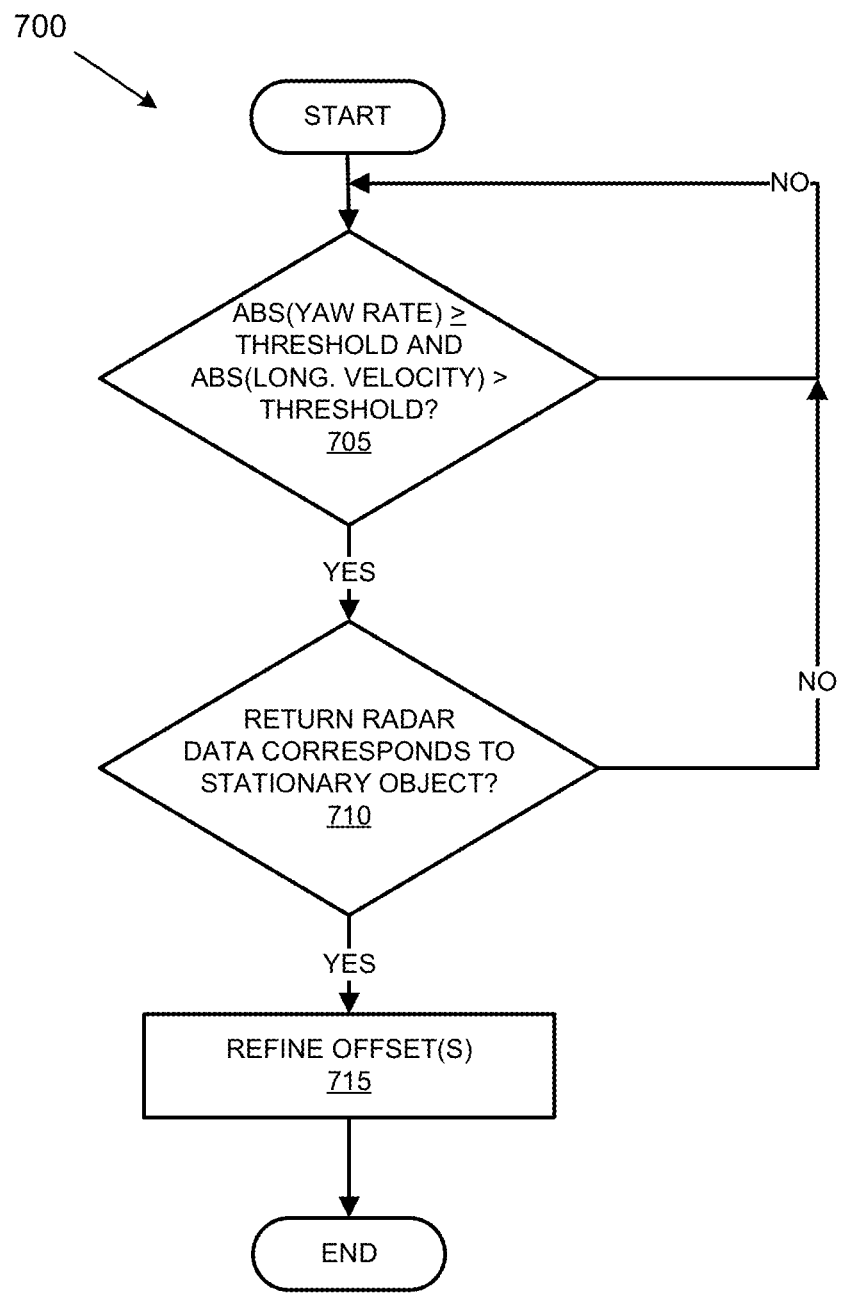
FIG. 7 is a flow diagram illustrating an example process for determining whether an iterative offset estimation should occur for the corresponding detection.

FIG. 7 is a flowchart of an exemplary process 700 for estimating an offset of the radar sensor 115. Blocks of the process 700 can be executed by the computer 110. The process 700 begins at block 705 in which a determination is made whether the absolute value of the yaw rate is greater than or equal to the predetermined yaw rate threshold and whether the absolute value of the longitudinal velocity is greater than the predetermined longitudinal velocity threshold. If the absolute value of the yaw rate is less than or equal to the predetermined yaw rate threshold or the absolute value of the longitudinal velocity is not greater than a predetermined longitudinal velocity threshold, the process 700 returns to block 705.

If the absolute value of the yaw rate is greater than the predetermined yaw rate threshold and the absolute value of the longitudinal velocity is greater than a predetermined longitudinal velocity threshold, a determination is made whether the radar sensor 115 return data corresponds to a stationary object at block 710. If the radar sensor 115 return data does not correspond to a stationary object, the process 700 returns to block 705. If the radar sensor 115 return data corresponds to a stationary object, an orientation offset is determined at block 715. An example process for determining the offset(s) is discussed below with respect to FIG. 8.

Figure 8:
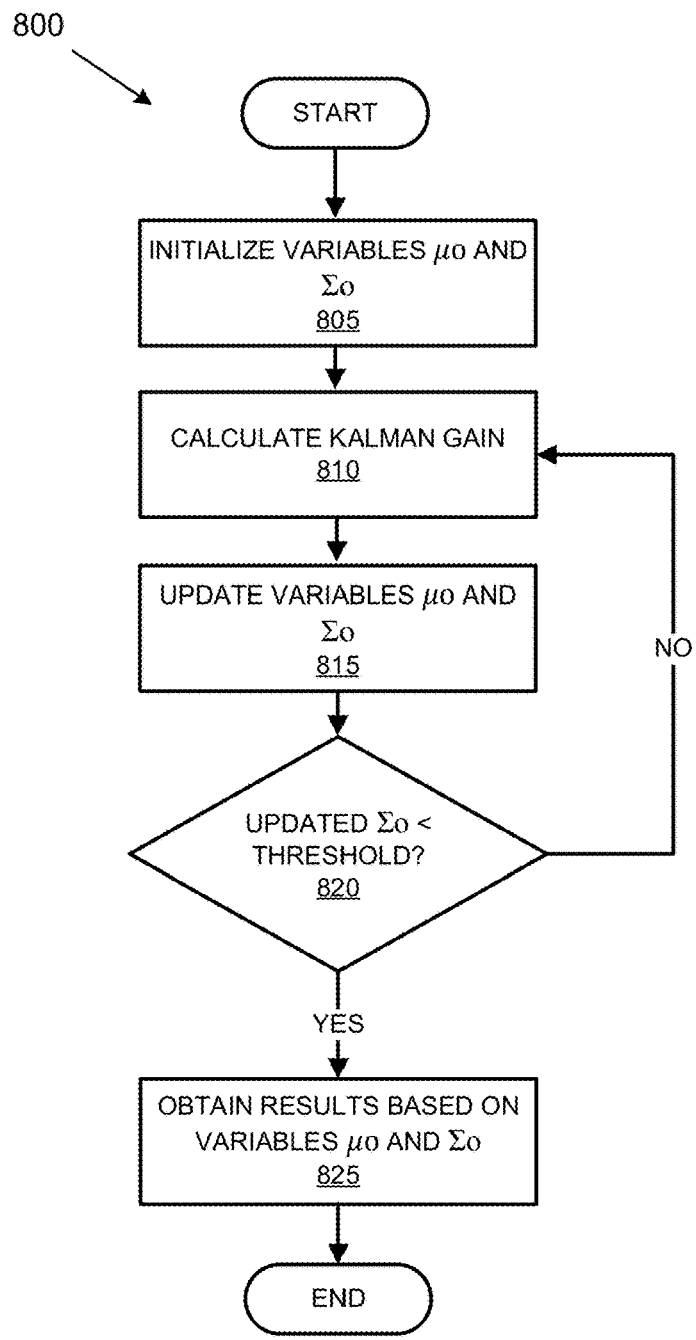
FIG. 8 is a flow diagram illustrating another example process for estimating the offset of the radar sensor.

FIG. 8 is a flowchart of an exemplary process 800 for determining and/or updating the offset of the radar sensor 115. Blocks of the process 800 can be executed by the computer 110. The process 800 begins at block 805 in which the computer 110 initializes variable μo and variable Σo. In an example implementation, the computer 110 initializes the variables μo and Σo to preset variables.

At block 810, a Kalman gain Ko for the offset is calculated. The computer 110 can calculate a Kalman gain Ko based on the variable Σo using Equation 7:

$$Ko = \Sigma H^T (H \Sigma H^T + J_\psi \Sigma_\psi J_\psi^T + J_{Vx} \Sigma_{Vx} J_{Vx}^T + J_{Vy} \Sigma_{Vy} J_{Vy}^T + J_\phi \Sigma_\phi J_\phi^T + J_\theta \Sigma_\theta J_\theta^T + \Sigma \dot{r})^{-1},\quad \text{Eq. 7}$$

where H is the Jacobian of the measurement ṙ with respect to the radar states $L_x$ and $L_y$, which is computed using Equation 1. The variable $H^T$ represents the transpose of the Jacobian. The variables $J_{vx}$, $J_{vy}$, $J_\psi$, $J_\theta$, and $J_\phi$ represent the Jacobians of the longitudinal velocity, the lateral velocity, the yaw rate, the orientation estimate, and azimuth values with respect to the measurement ṙ, which can also be computed using Equation 1. The variables $\Sigma_{vx}$, $\Sigma_{vy}$, $\Sigma_\psi$, $\Sigma_\theta$, $\Sigma_\phi$, and $\Sigma\dot{r}$ represent the variances associated with vx, vy, ψ, θ, φ, and ṙ, respectively.

At block 815, the variables μo and Σo are updated based on additional data received by the non-radar sensors 115 and the radar sensors 115. In an example implementation, the computer 110 updates the variables μ and Σ using Equations 8 and 9, which are defined as:

$$\mu o_c = \mu o_p + K(\dot{r} - h(\mu, vx, vy, \psi, \theta, \phi)),\quad \text{Eq. 8}$$

$$\Sigma o_c = (I - KH)\Sigma o_p,\quad \text{Eq. 9}$$

The variable $\mu o_c$ represents the current offset, the variable $\mu o_p$ represents the previously calculated offset, the variable $\Sigma o_c$ represents the current variance for the offset, the variable $\Sigma o_p$ represents the previously calculated variance offset, and h(μ,vx,vy,ψ,θ,φ) represents the expected measurement calculated using Equation 1. The computer 110 may iteratively calculate $\mu o_c$ and $\Sigma o_c$ such that the offset estimate continues to converge about a value that represents the determined offset. At block 820, a determination is made whether the variable $\Sigma o_c$ is below a predetermined uncertainty threshold. If the variable $\Sigma o_c$ is not below the predetermined uncertainty threshold, the process 800 returns to block 815. Otherwise, the variables μo and Σo are set to the current calculated values at block 825, and μo is used as the determined offset. The determined orientation and offset for the radar sensor 115 can be used by the process 200 at block 240 to determine whether one or more vehicle 105 system actions should be initiated.

The above-mentioned thresholds can be determined based on sensor data collected via one or more suitable vehicle 105 sensor systems and empirical analysis applied to the sensor data.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory including instructions such that the processor is programmed to:
   receive, from a radar sensor of a vehicle, radar data indicative of a stationary object proximate to the radar sensor;
   receive, from a non-radar sensor of the vehicle, vehicle state data indicative of a vehicle state, the vehicle state data indicative of at least a longitudinal velocity and a yaw rate of the vehicle;
   associate the vehicle state data with the radar data based on a respective timestamp of the vehicle state data and the radar data being received within a defined time period;
   determine an orientation estimate and an offset estimate of the radar sensor based on the radar data and the vehicle state data; and
   determine whether to actuate a vehicle system based on at least one of the orientation estimate or the offset estimate.

2. The system of claim 1, wherein the processor is further programmed to:
   actuate the vehicle system based on the at least one of the orientation estimate or the offset estimate.

3. The system of claim 2, wherein the actuation of the vehicle system includes disabling an autonomous driving mode of the vehicle.

4. The system of claim 1, wherein the processor is further programmed to:
  determine the orientation estimate and the offset estimate of the radar sensor according to $v_x \cos(\theta+\phi)+v_y \sin(\theta+\phi)+\dot{\psi}(L_x \sin(\theta+\phi)-L_y \cos(\theta+\phi))+\dot{r}=0$, where $v_x$ represents the longitudinal velocity, $v_y$ represents lateral velocity, $\dot{\psi}$ represents the yaw rate, $\phi$ represents an angle of a radar sensor return relative to a center of the radar sensor, $\dot{r}$ represents a range rate of the radar sensor return, $\theta$ represents the orientation estimate of the radar sensor, $L_x$ represents a longitudinal position of the radar sensor, and $L_y$ represents a lateral position of the radar sensor.

5. The system of claim 4, wherein the processor is further programmed to:
  determine the orientation estimate of the radar sensor based on a Kalman filter.

6. The system of claim 5, wherein a Kalman filter gain of the Kalman filter is defined as $K=\Sigma H^T(H\Sigma H^T+J_{V_x}\Sigma_{V_x}J_{V_x}^T+J_{V_y}\Sigma_{V_y}J_{V_y}^T+J_\phi\Sigma_\phi J_\phi^T+\Sigma\dot{r})^{-1}$, where H is a Jacobian of the $\dot{r}$ with respect to the orientation estimate, $H^T$ represents a transpose of the Jacobian H, $J_{V_x}$ represents a Jacobian of the longitudinal velocity with respect to the $\dot{r}$, $J_{V_y}$ represents a Jacobian of the lateral velocity with respect to the $\dot{r}$, $J_\phi$ represents a Jacobian of an azimuth of the radar sensor with respect to the $\dot{r}$, $\Sigma_{V_x}$ represents a variance associated with $v_x$, $\Sigma_{V_y}$ represents a variance associated with $v_y$, $\Sigma_\phi$ represents a variance associated with $\phi$, and $\Sigma\dot{r}$ represent a variance associated with $\dot{r}$.

7. The system of claim 4, wherein the processor is further programmed to:
  determine the offset estimate of the radar sensor based on a Kalman filter.

8. The system of claim 7, wherein a Kalman filter gain of the Kalman filter is defined as $Ko=\Sigma H^T(H\Sigma H^T+J_{\dot\psi}\Sigma_{\dot\psi}J_{\dot\psi}^T+J_{V_x}\Sigma_{V_x}J_{V_x}^T+J_{V_y}\Sigma_{V_y}J_{V_y}^T+J_\phi\Sigma_\phi J_\phi^T+J_\theta\Sigma_\theta J_\theta^T+\Sigma\dot{r})^{-1}$, where H is a Jacobian of the $\dot{r}$ with respect to the offset estimate, $H^T$ represents a transpose of the Jacobian H, $J_{\dot\psi}$ represents a Jacobian of the yaw rate with respect to the $\dot{r}$, $J_{V_x}$ represents a Jacobian of the longitudinal velocity with respect to the $\bar{r}$, $J_{V_y}$ represents a Jacobian of the lateral velocity with respect to the $\dot{r}$, $J_\phi$ represents a Jacobian of an azimuth of the radar sensor with respect to the $\dot{r}$, $\Sigma\dot\psi$ represents a variance associated with $\dot\psi$, $\Sigma_{V_x}$ represents a variance associated with $v_x$, $\Sigma_{V_y}$ represents a variance associated with $v_y$, $\Sigma_\phi$ represents a variance associated with $\phi$, and $\Sigma\dot{r}$ represent a variance associated with $\dot{r}$.

9. The system of claim 1, wherein the non-radar sensor includes at least one of a wheel odometry sensor, an inertial measurement unit, a visual odometry sensor, or a Global Positioning System sensor.

10. The system of claim 1, wherein the processor is further programmed to:
  filter radar data and vehicle state data indicating that at least one of a lateral velocity is greater than or equal to a predetermined lateral velocity threshold or a yaw rate is greater than or equal to a predetermined yaw rate threshold.

11. The system of claim 1, wherein the processor is further programmed to:
  select an initial orientation based on a most-occurring calculated orientation value within a plurality of calculated orientation values.

12. A system, comprising a computer including a processor and a memory, the memory including instructions such that the processor is programmed to:
  receive, from a radar sensor of a vehicle, radar data indicative of a stationary object proximate to the radar sensor;
  receive, from a non-radar sensor of the vehicle, vehicle state data indicative of a vehicle state, the vehicle state data indicative of at least a longitudinal velocity and a yaw rate of the vehicle;
  filter radar data and vehicle state data indicating that at least one of a lateral velocity is greater than or equal to a predetermined lateral velocity threshold or a yaw rate is greater than or equal to a predetermined yaw rate threshold;
  determine an orientation estimate and an offset estimate of the radar sensor based on the radar data and the vehicle state data; and
  determine whether to actuate a vehicle system based on at least one of the orientation estimate or the offset estimate.

13. The system of claim 12, wherein the processor is further programmed to:
  associate the vehicle state data with the radar data based on a respective timestamp of the vehicle state data and the radar data being received within a defined time period.

14. The system of claim 12, wherein the processor is further programmed to:
  actuate the vehicle system based on the at least one of the orientation estimate or the offset estimate.

15. The system of claim 14, wherein the actuation of the vehicle system includes disabling an autonomous driving mode of the vehicle.

16. The system of claim 12, wherein the processor is further programmed to: determine the orientation estimate and the offset estimate of the radar sensor according to to $v_x \cos(\theta+\phi)+v_y \sin(\theta+\phi)+\dot{\psi}(L_x \sin(\theta+\phi)-L_y \cos(\theta+\phi))+\dot{r}=0$, where $v_x$ represents the longitudinal velocity, $v_y$ represents lateral velocity, $\dot{\psi}$ represents the yaw rate, $\phi$ represents an angle of a radar sensor return relative to a center of the radar sensor, $\dot{r}$ represents a range rate of the radar sensor return, $\theta$ represents the orientation estimate of the radar sensor, $L_x$ represents a longitudinal position of the radar sensor, and $L_y$ represents a lateral position of the radar sensor.

17. The system of claim 12, wherein the non-radar sensor includes at least one of a wheel odometry sensor, an inertial measurement unit, a visual odometry sensor, or a Global Positioning System sensor.

18. The system of claim 12, wherein the processor is further programmed to:
  select an initial orientation based on a most-occurring calculated orientation value within a plurality of calculated orientation values.

19. A system, comprising a computer including a processor and a memory, the memory including instructions such that the processor is programmed to:
  receive, from a radar sensor of a vehicle, radar data indicative of a stationary object proximate to the radar sensor;
  receive, from a non-radar sensor of the vehicle, vehicle state data indicative of a vehicle state, the vehicle state data indicative of at least a longitudinal velocity and a yaw rate of the vehicle;
  select an initial orientation based on a most-occurring calculated orientation value within a plurality of calculated orientation values;
  determine an orientation estimate and an offset estimate of the radar sensor based on the radar data and the vehicle state data; and determine whether to actuate a vehicle system based on at least one of the orientation estimate or the offset estimate.

20. The system of claim 18, wherein the processor is further programmed to:
actuate the vehicle system based on the at least one of the orientation estimate or the offset estimate.

21. The system of claim 18, wherein the processor is further programmed to:
determine the orientation estimate and the offset estimate of the radar sensor according to to $v_x \cos(\theta+\phi)+v_y \sin(\theta+\phi)+\dot{\psi}(L_x \sin(\theta+\phi)-L_y \cos(\theta+\phi))+\dot{r}=0$, where $v_x$ represents the longitudinal velocity, $v_y$ represents lateral velocity, $\dot{\psi}$ represents the yaw rate, $\phi$ represents an angle of a radar sensor return relative to a center of the radar sensor, $\dot{r}$ represents a range rate of the radar sensor return, $\theta$ represents the orientation estimate of the radar sensor, $L_x$ represents a longitudinal position of the radar sensor, and $L_y$ represents a lateral position of the radar sensor.

* * * * *